(12) United States Patent
Salter et al.

(10) Patent No.: US 11,847,712 B2
(45) Date of Patent: Dec. 19, 2023

(54) RIDEHAIL SEAT RESERVATION ENFORCEMENT SYSTEMS AND METHODS

(71) Applicant: Ford Global Technologies, LLC, Dearborn, MI (US)

(72) Inventors: Stuart C. Salter, White Lake, MI (US); Adam Carlson, Ann Arbor, MI (US); Benjamin Solomon Richer, Detroit, MI (US); Peter Phung, Windsor (CA); Annette Lynn Huebner, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 655 days.

(21) Appl. No.: 17/063,959

(22) Filed: Oct. 6, 2020

(65) Prior Publication Data

US 2022/0108228 A1    Apr. 7, 2022

(51) Int. Cl.
| | |
|---|---|
| *G06Q 50/30* | (2012.01) |
| *G06Q 10/02* | (2012.01) |
| *B60Q 3/12* | (2017.01) |
| *B60N 2/00* | (2006.01) |
| *B60N 2/90* | (2018.01) |

(Continued)

(52) U.S. Cl.
CPC ............. *G06Q 50/30* (2013.01); *B60N 2/002* (2013.01); *B60N 2/90* (2018.02); *B60Q 1/503* (2013.01); *B60Q 1/507* (2022.05); *B60Q 1/543* (2022.05); *B60Q 3/12* (2017.02); *B60Q 5/00* (2013.01); *E05B 81/77* (2013.01); *E05B 81/78* (2013.01); *G06F 21/32* (2013.01); *G06Q 10/02* (2013.01); *G06V 20/59* (2022.01); *G06V 40/103* (2022.01); *G06V 40/172* (2022.01); *H04W 4/023* (2013.01);

(Continued)

(58) Field of Classification Search
None
See application file for complete search history.

(56) References Cited

U.S. PATENT DOCUMENTS

| | | |
|---|---|---|
| 9,442,888 B2 | 9/2016 | Stanfield et al. |
| 10,942,035 B2 * | 3/2021 | Aiuchi .................. B60N 2/245 |

(Continued)

FOREIGN PATENT DOCUMENTS

WO    2019/152471 A2    8/2019

OTHER PUBLICATIONS

TechNave "Grab adds more priority to driver-partner safety with Passenger Verification feature with recognition technology," Web page <https://technave.com/gadget/Grab-adds-more-priority-to-driver-partner-safety-with-Passenger-Verification-feature-with-facial-recognition-technology-14193.html>, 4 pages, retrieved from the interenet on Oct. 6, 2020.

*Primary Examiner* — Fekadeselassie Girma
(74) *Attorney, Agent, or Firm* — Brandon Hicks; Eversheds Sutherland (US) LLP

(57) ABSTRACT

Ridehail seat reservation enforcement and user direction systems and methods are disclosed herein. An example method can include receiving a ridehail request that includes a seat selection of a first seat of a ridehail vehicle, the first seat being access through a first door of the ridehail vehicle, activating an external notification feature of the vehicle prior to a user entering the ridehail vehicle when the user attempts to enter the ridehail vehicle on a side of the vehicle associated with the first seat, and activating an internal notification feature of the ridehail vehicle when the user attempts to sit in a second seat that is not the first seat.

20 Claims, 8 Drawing Sheets

(51) Int. Cl.
  *G06F 21/32*   (2013.01)
  *H04W 4/02*    (2018.01)
  *E05B 81/76*   (2014.01)
  *E05B 81/78*   (2014.01)
  *B60Q 5/00*    (2006.01)
  *G06V 20/59*   (2022.01)
  *G06V 40/10*   (2022.01)
  *G06V 40/16*   (2022.01)
  *B60Q 1/50*    (2006.01)
  *B60Q 1/32*    (2006.01)

(52) U.S. Cl.
  CPC ........ *B60N 2002/981* (2018.02); *B60Q 1/323* (2013.01); *B60Q 2400/50* (2013.01)

(56) References Cited

U.S. PATENT DOCUMENTS

| | | | |
|---|---|---|---|
| 11,210,755 B2 * | 12/2021 | Mitsumaki | H04L 67/1097 |
| 11,511,754 B2 * | 11/2022 | Yamashita | B60W 40/08 |
| 2004/0200383 A1 * | 10/2004 | Raoul | B61D 41/00 |
| | | | 105/329.1 |
| 2009/0033493 A1 * | 2/2009 | Lin | G06K 7/0008 |
| | | | 340/572.1 |
| 2019/0197325 A1 * | 6/2019 | Reiley | G08B 13/19602 |
| 2020/0070715 A1 * | 3/2020 | Krause | B60Q 9/00 |
| 2020/0198581 A1 * | 6/2020 | Ette | B60R 25/31 |
| 2020/0238952 A1 * | 7/2020 | Lindsay | G06V 30/194 |
| 2021/0156700 A1 * | 5/2021 | Davis | G10L 17/06 |
| 2022/0108228 A1 * | 4/2022 | Salter | B60N 2/0244 |

* cited by examiner

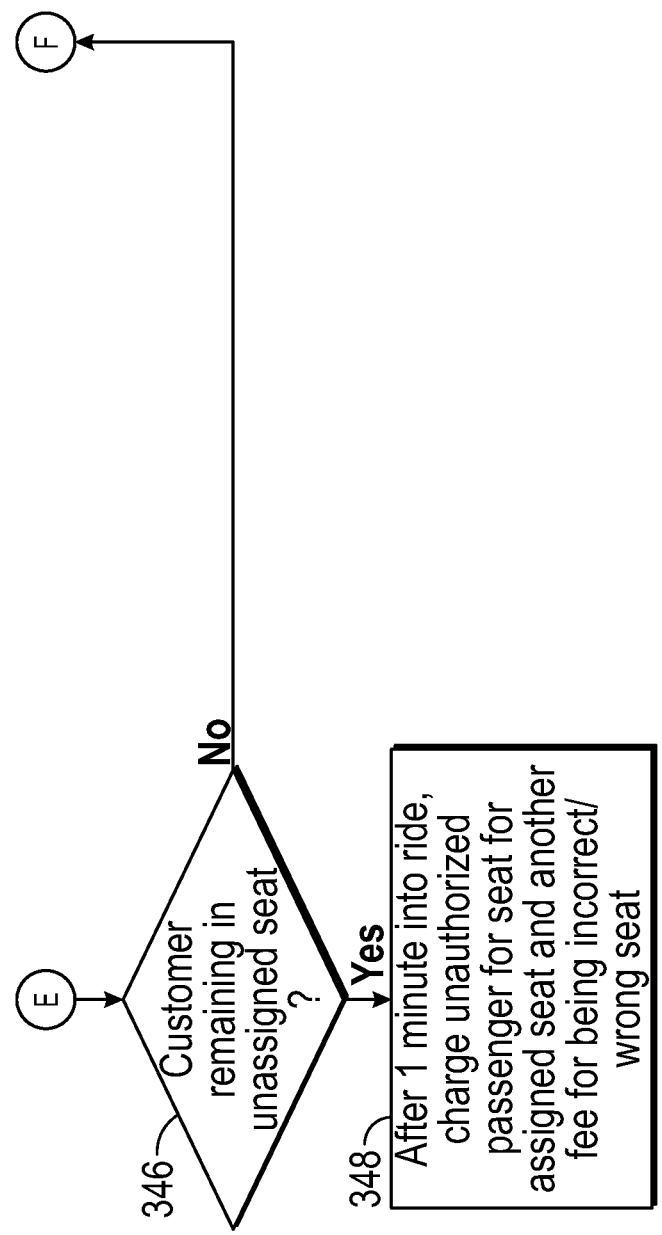

RIDEHAIL SEAT RESERVATION ENFORCEMENT SYSTEMS AND METHODS

BACKGROUND

Seat selection in transportation services is a matter of pricing and user-preference. Various riders may book a ride in an autonomous ridehail vehicle, and when multiple riders select a pooled ride option, seat selection is often provided on a first-come, first-served basis. If a rider were to be able to select and reserve their seat, it may be difficult to keep this reserved seat free and available to the correct user when no driver is present in the ridehail vehicle.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
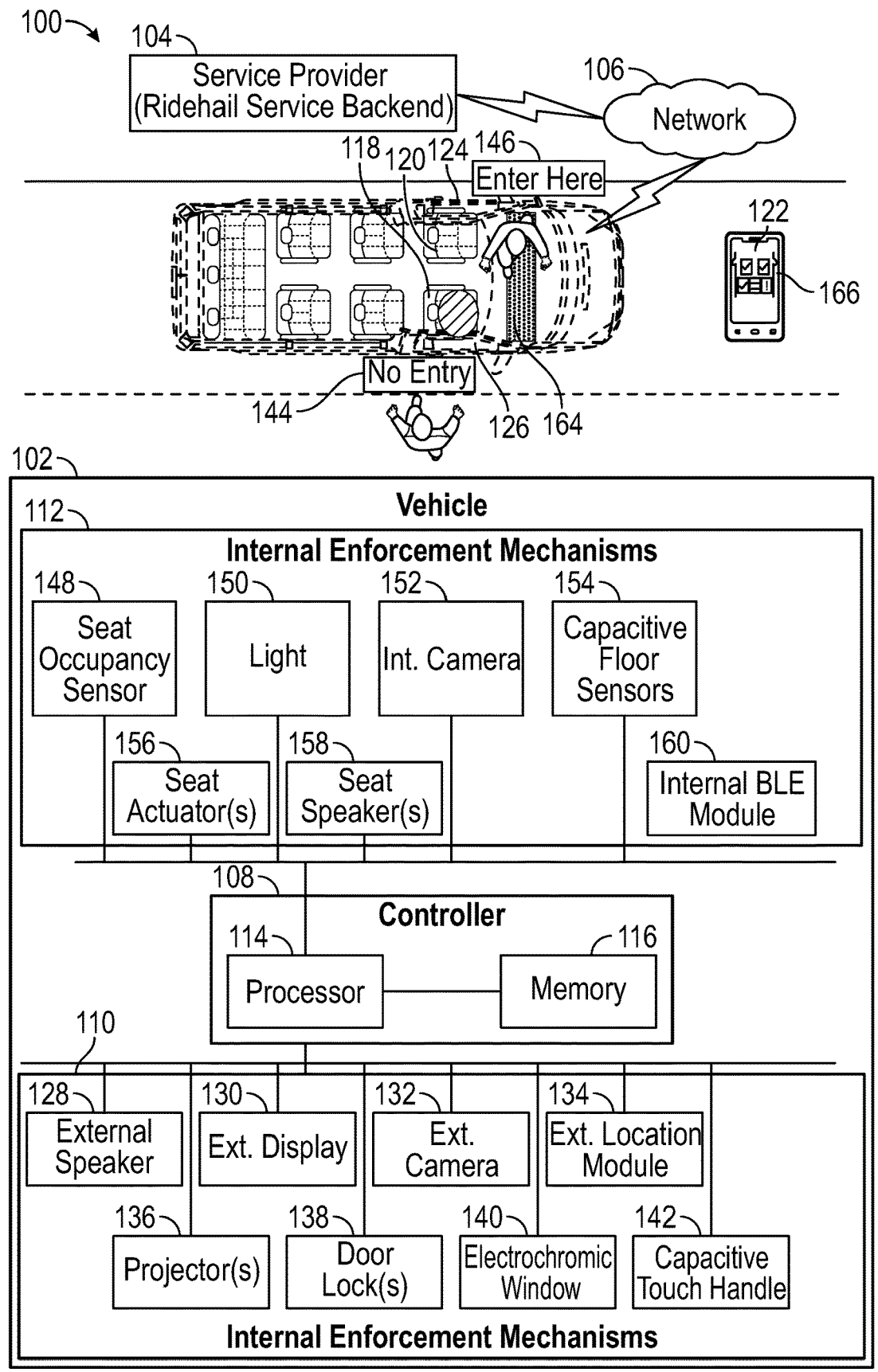
FIG. 1 depicts an illustrative architecture in which techniques and structures for providing the systems and methods disclosed herein may be implemented.
Figure 1:
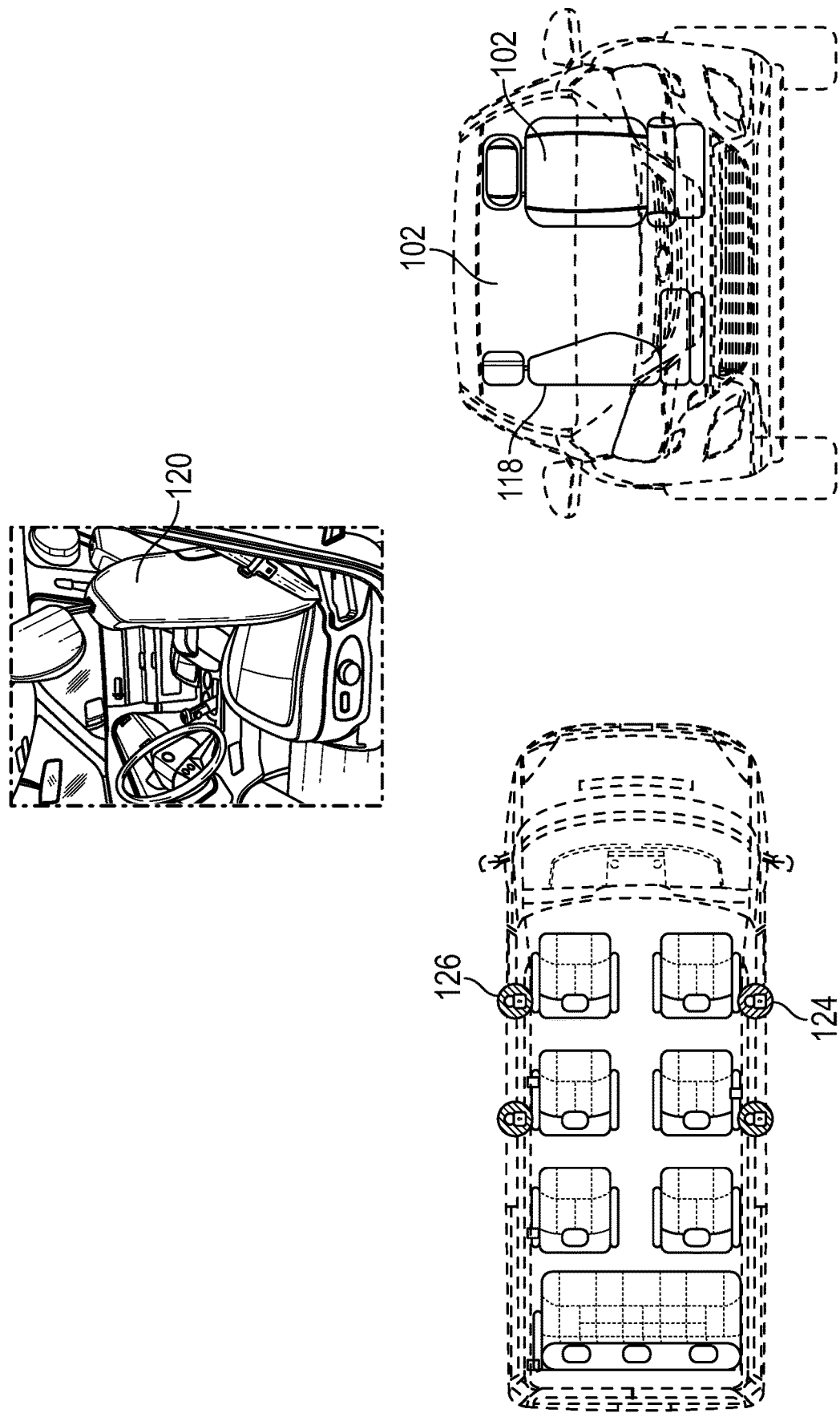

The present disclosure generally relates to systems and methods for ensuring and enforcing seat reservations in ridehail vehicles. These systems and methods provide a means to encourage and enforce seat reservations in an autonomous vehicle (AV) with no human interaction and/or enforcement. These systems and methods allow for riders to reach their seats without interference by other customers in their seats or in their way. These systems and methods can also direct and instruct users on finding their reserved/assigned seats.

The systems and methods may involve exterior enforcement mechanisms/features and interior mechanisms/features to accomplish this goal. Exterior mechanisms/features may include sound exciters on various doors of the vehicle, display access panels, exterior cameras, Bluetooth® Low Energy (BLE) antennas for rider triangulation, puddle lamps to inform riders of their designated door, door locks that only open the designated door while other doors remain locked, electrochromic windows (e.g., could turn certain color for certain user), and capacitive door handles (that may work in conjunction with the sound exciters).

Interior mechanisms/features may include seat occupant sensors (e.g., weight sensors), interior lights that shine on the correct seat, map lamps for each seat such as RGB (Red, Green, Blue) and/or UV (Ultraviolet), interior cameras, capacitive floor sensors (to help determine if a rider is still moving or not), BLE antennas inside the vehicle for triangulation, power seats with vibration if the rider is in the wrong seat, heat and/or cool seats to deter rider from sitting in the wrong seat, and audio speakers in the headrest. Non-occupied and/or reserved seats can also be angled forward or turned away from a user or an aisle used to access the seat. Services could also be denied if the rider is in the wrong seat (e.g., no Wi-Fi, climate controls, seat power options, etc.).

In general, the systems and methods of the present disclosure provide a solution that audibly or visually assists a user in identifying an appropriate entry method and seating location for a ridehail. This can include using one or more available visual, auditory, and physical prompts to find a designated seat. A wrong touch tone can be used when a user approaches from the wrong side of the vehicle (with an escalating repeating tone from their cell phone speaker) or the user touches the wrong handle (sound exciter) or sits in the wrong seat (headrest speaker). Capacitive foot tracking can be used to determine when a person is sitting in a seat or making progress toward their assigned seat.

User alerting and messaging can specifically involve including a user's name when giving instructions through the sound exciter (exterior) and speakers (interior) to both cuts through audio clutter (get the user's attention) and get a better response. The user can be identified using a unique identifier, nickname, or user-selected name. Seats can be angled or rotated to improve movement in the vehicle while making it difficult/highly uncomfortable to sit in an unassigned seat or a seat assigned to another user. The systems and method can implement a denial of services to encourage the user to move to their designated seat and/or output of specific unpleasant sounds through the seat speaker to encourage the user to move to their designated seat.

Visual and auditory feedback can be implemented to encourage riders to use the assigned or reserved seat through any of mobile device alerts to indicate proper access; exterior and interior vehicle lighting indicate correct access point and seat and direct if the wrong door is approached; exterior screens point arrows in right directions to the proper door; exterior and interior vehicle audio informing of seating location and alert chimes if using wrong door; shade windows at wrong seats to make proper seat location seem appealing using electrochromic windows; providing an interior log in at proper seats only, and displaying or projecting a message onto the seat that identifies to the user their reserved seat—just to name a few.

Physical feedback can be used to prevent a user from accessing incorrect seating or starting a ride from the incorrect seat using any one or more of door locks and handles preventing access to doors which do not provide access to the reserved or assigned seat; seats locked in non-seating position to prevent use; vehicle does not allow the trip to begin without a rider in their reserved seat—otherwise, the user can be charged extra; prevent seat belts from securing in seats that aren't available and doesn't start the ride without seatbelt secured; seat moves to an uncomfortable position if someone sits in it when it isn't available and/or vehicle places items to block seating in the not available seats.

Illustrative Embodiments

Turning now to the drawings, FIG. 1 depicts an illustrative architecture 100 in which techniques and structures of the present disclosure may be implemented. The architecture 100 can include an autonomous ridehail vehicle (hereinafter "vehicle 102"), a service provider 104, and a network 106.

The network 106 may include any one or a combination of multiple different types of networks, such as cable networks, the Internet, cellular networks, wireless networks, and other private and/or public networks. In some instances, the network 106 may include cellular, Wi-Fi, or Wi-Fi direct. In other embodiments, components of the environment can communicate using short-range wireless protocols such as Bluetooth®, near-field, infrared, and the like.

The vehicle 102 can comprise a controller 108, one or more external enforcement/notification mechanisms 110, and one or more internal enforcement/notification mechanisms 112. Both the one or more external enforcement mechanisms 110 and the one or more internal enforcement mechanisms 112 are illustrated in a schematic format in FIG. 1. Some implementations may illustrate specific examples of these enforcement mechanisms and their use. Broadly, each of the external enforcement mechanisms 110 and the one or more internal enforcement mechanisms 112 can be activated by the controller 108 as will be described in the various use-case examples disclosed infra.

The controller 108 can comprise a processor 114 and memory 116. The memory 116 stores instructions that can be executed by the processor 114 to perform any of the ridehail vehicle seat reservation and enforcement features disclosed herein. The controller 108 can be configured to communicate over the network 106 with any of the components of the architecture such as the service provider 104. The controller 108 can incorporate or use any known communication device to transmit and/or receive data over the network 106. When referencing operations performed by the controller 108, it will be understood that this includes the execution of instructions stored in the memory 116 by the processor 114.

The vehicle 102 can comprise a plurality of seats such as a first seat 118 and a second seat 120. While the vehicle 102 can include any number of seats, the first seat 118 and the second seat 120 may be referenced in example use cases. In general, the first seat 118 may be referred to as the reserved seat. That is, a first user can reserve the first seat 118 when submitting a ridehail request to the service provider 104. This request could be facilitated using a mobile device 122. The mobile device 122 can execute an application used to facilitate ridehail services with the service provider 104. The application can enable the user to maintain a record or profile with the service provider 104 that links the mobile device 122 to the user. Thus, the detected presence or location of the mobile device 122 can be inferred as a presence or location of the user. While a seat can be reserved, the method disclosed herein can also allow for enforcement of assigned seating as well as reserved seating.

The second seat 120 is indicative of any other non-reserved seat in the vehicle 102 or seat that has been reserved by another user. In general, when the user attempts to access any seat that they have not reserved, the controller 108 can remediate this attempt to access this seat through the use of the external enforcement mechanisms 110 and/or the one or more internal enforcement mechanisms 112.

The vehicle 102 can comprise one or more doors. In some instances, each door can be associated with a particular seat. For example, a first door 124 can be associated with the first seat 118, while a second door 126 can be associated with another seat, such as the second seat 120. Not all configurations require specific doors to be associated with specific seats. In some instances, the vehicle 102 may have a single communal door, such as common with vans and buses. In general, the user can be alerted when they are approaching a door that is not associated with their reserved seat.

The one or more external enforcement mechanisms 110 can include an external speaker 128 (also referred to as a sound exciter), an external display panel 130, an exterior camera 132, an external location module 134, a projector 136, a door lock 138, an electrochromic window 140, and a capacitive touch door handle 142. Some of these components can be used individually or in combination.

In general, the external speaker 128 can output warning messages or tones to an approaching user. For example, when the user is approaching a door that is not associated with their reserved seat (such as the second door 126 rather than the first door 124), the external speaker could 128 can output a warning tone or message that alerts the user that they are attempting to open the wrong door. An example message could include a description of the door that is associated with their reserved seat or directions to their designated door. When the user attempts to open the second door 126, the external speaker 128 can output a warning message to the user to move to and open the first door 124 instead.

The external display panel 130 can be configured to display messages to a user to direct them to the proper door for entry into the vehicle 102. For example, when the user is approaching a door that is not associated with their reserved seat, the controller 108 can cause the external display panel 130 to display a message that alerts the user that they are attempting to open the wrong door. An example message could include a description of the door that is associated with their reserved seat. When the user attempts to open the second door 126, the controller 108 can cause the external display panel 130 to display a warning message to the user to open the first door 124.

The exterior camera 132 can be utilized to obtain images of the face of the user. The controller 108 can execute facial recognition logic stored in the memory 116. The user can maintain a record with the service provider 104 that can be used to store a facial profile or other biometric information. The controller 108 can match the face of the user with the facial profile stored for the user through communication with the service provider 104. Once the user is authenticated and/or authorized using facial recognition, the controller 108 can determine which seat of the vehicle has been reserved by the user and direct the user to the reserved seat using any of the methods disclosed herein.

The output from the external location module 134 can be used to determine the location of the user. For example, the external location module 134 can communicate with the mobile device 122 of the user to triangulate the position of the user relative to their current location with respect to the vehicle. The external location module 134 could include a BLE module that communicates with the mobile device 122 over a short-range wireless connection. Other short-range or long-range wireless communication protocols can also be used.

The controller 108 can receive output from the external location module 134 and triangulate the location of the mobile device 122. The location can include determining which side of the vehicle 102 the mobile device 122 is located. In other instances, the location can include determining a specific door of the vehicle 102 that the mobile device 122 is positioned in front of. When the position of the user is known, the controller 108 can use any of the methods disclosed herein for directing the user to a reserved seat or warning the user when they are in the wrong location (such as relative to a particular door) or seat.

The projector 136 can be used to project images onto a ground in front of a door of the vehicle. The projector 136 could include a laser puddle lamp or laser projector. When the user is in front of the wrong door, such as the second door 126, the controller 108 can cause a projector associated with the second door 126 can project a message 144 on the ground that indicates to the user that they are about to enter the wrong door. This feature could be used in combination with any other enforcement method or feature disclosed herein such as activating a door lock, outputting an audible message, or displaying a message on a display screen—just to name a few. In another example, the controller 108 can cause a projector associated with the first door 124 can project a message 146 on the ground that indicates to the user to enter the first door 124.

The controller 108 can also cause locking and/or unlocking of the door lock 138 in response to user presence and prior seat reservation. Each of the doors of the vehicle could be associated with a door lock such as the door lock 138. The door lock 138 can be controlled in response to user presence, as determined above from the output of the external location module 134. For example, when the user in front of the door associated with their reserved seat, the door lock 138 can be actuated to unlock by the controller 108. When the user in front of a door that is not associated with their reserved seat, the door lock 138 can be actuated to lock or remain locked by the controller 108. In another example, the mobile device 122 can be used as a key (e.g., PaaK—Phone as a Key) to unlock the door associated with their reserved seat, but not another seat that is not associated with their reserved seat.

The controller 108 can also control the operation of the electrochromic window 140 to direct a user to the correct door associated with their reserved seat. For example, the first door 124 can include the electrochromic window 140. Indeed, each of the doors of the vehicle can be configured with an electrochromic window. The electrochromic window 140 of the first door 124 can be transitioned from being opaque to transparent to allow the user to identify the correct door to enter. Doors associated with seats that have not been reserved by the user can be made opaque by the controller 108.

The controller 108 can also direct the user to their reserved seat using the capacitive touch door handle 142. For example, each door of the vehicle can include a capacitive touch door handle. The capacitive touch door handle 142 can be associated with the first door 124. When the user touches the capacitive touch door handle 142, the door lock 138 associated with the first door 124 can be unlocked. Other doors of the vehicle may not be unlocked when the user touches a capacitive touch door handle of a door not associated with the seat reserved by the user. The use of capacitive touch can be enabled when the mobile device 122 of the user is present. When the user touches the capacitive touch door handle 142 in the presence of the mobile device 122, the mobile device 122 can exchange data with the capacitive touch door handle 142 to unlock the door lock 138 associated with the first door 124.

Once the user has entered the vehicle 102, one or more internal enforcement mechanisms 112 can be used to enforce seat reservation and occupancy. The one or more internal enforcement mechanisms 112 can include any of a seat occupancy sensor 148, a light 150, an interior camera 152, capacitive floor sensors 154, seat actuators 156, a seat speaker 158, and an internal BLE module 160—just to name a few.

The controller 108 can cause the seat occupancy sensor 148 to detect which seats are currently occupied or have recently been occupied by an entering user. The seat occupancy sensor 148 could include a pressure sensor that senses a weight of the user. The seat occupancy sensor 148 could include a seat belt sensor that determines if a seat belt has been buckled or not.

The output of the seat occupancy sensor 148 can be used by the controller 108 to determine if a reserved seat, such as the first seat 118 has been occupied by the user. For example, after the user has entered the vehicle through a door, the controller 108 can monitor the seat occupancy sensor 148 to determine when an associated set is occupied. When the reserved seat is occupied, the controller 108 can determine that the user is sitting in the proper seat. When another seat that is not reserved by this particular user has been recently occupied after entry of the user into the vehicle, the controller 108 can output a message through the seat speaker 158 to alert the user that they are in the wrong seat. The message could include guidance to assist the user in finding their reserved seat.

In some instances, the controller 108 can illuminate the light 150 associated with the reserved seat. The light can be controlled to have any desired hue/color. The light 150 of the reserved seat can be illuminated with a green hue, while lights associated with other seats can be illuminated with a red hue. The light 150 could be a red, green, blue (RGB) light, an ultraviolet light, or a light-emitting diode (LED)—just to name a few.

The controller 108 can receive images from the interior camera 152 to determine which seats of the vehicle are occupied or unoccupied. The controller 108 can also use facial recognition to determine which particular user is occupying a particular seat. The controller 108 can also recognize when a user who is occupying a seat is not the user who reserved the seat. When the presence of the user and their location have be determined by facial recognition, the controller 108 can output messages either audibly or through a display in the vehicle that is addressed to the specific user by name. In some instances, output of the interior camera 152 can be used in combination with output from the internal BLE module 160 to determine an exact position of a user within the vehicle 102.

The controller 108 can determine user position and movement within the interior of the vehicle using the output of the capacitive floor sensors 154. In some instances, the capacitive floor sensors 154 are positioned on the floor of the interior of the vehicle. The capacitive floor sensors 154 can sense a direction or positioning of the feet of a user.

Figure 2A:
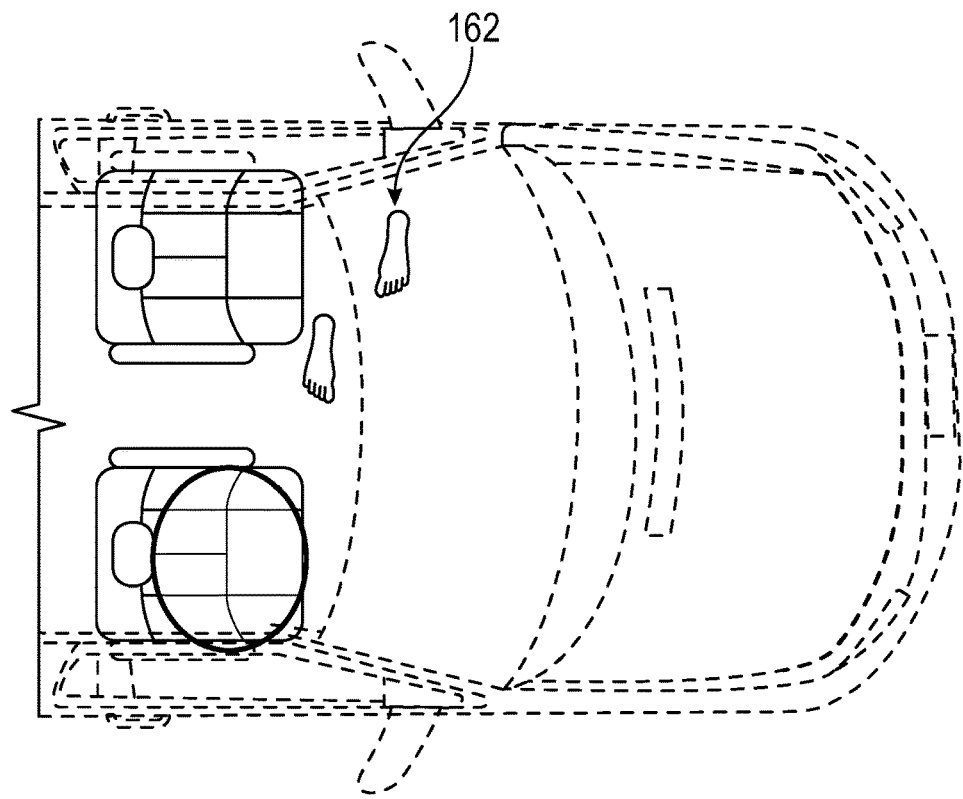
FIGS. 2A and 2B collectively illustrate the tracking of a user through capacitive foot sensors.
Figure 2B:
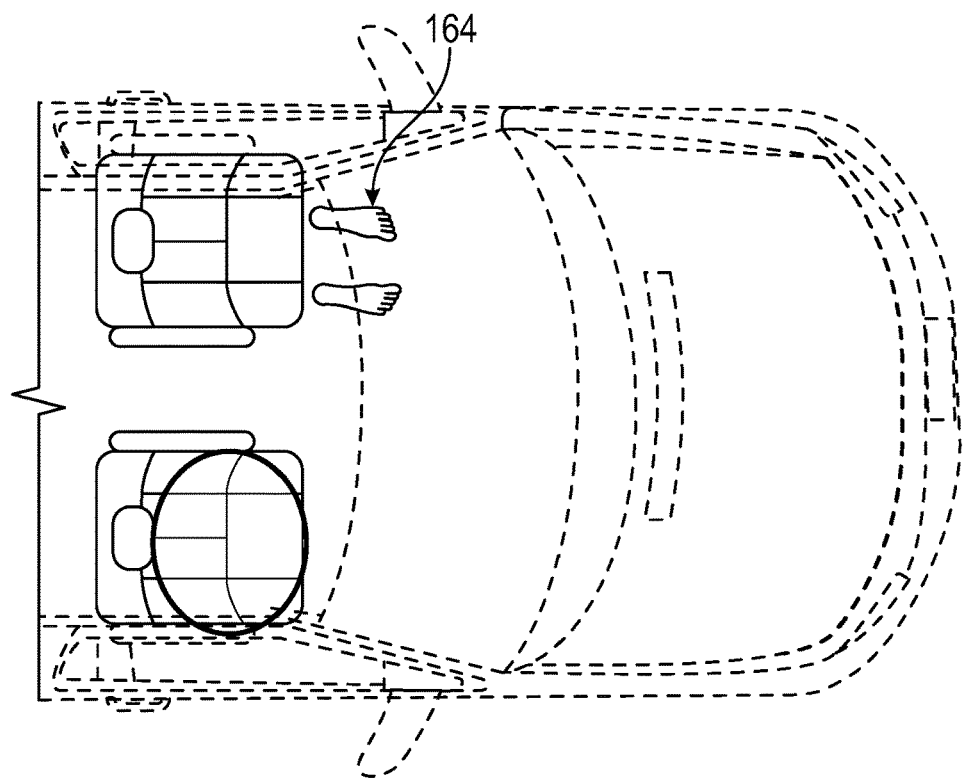

Example illustrative uses of the capacitive floor sensors 154 to sense user foot position are illustrated in FIGS. 2A and 2B (with reference to elements of FIG. 1). In FIG. 2A, the output of the capacitive floor sensors 154 corresponding user's feet 162 are determined to be oriented orthogonally to a typical sitting position for the first seat 118. Thus, the controller 108 can infer that the user is walking through the vehicle 102. In FIG. 2B, output of the capacitive floor sensors 154 corresponding user's feet 162 are determined to be oriented in parallel or aligned to a typical sitting position for the first seat 118. Thus, the controller 108 can infer that the user is sitting in the first seat 118.

The controller 108 can be adapted to control individual seat operations through the use of the seat actuators 156. For example, the seat actuators 156 can be associated with the first seat 118. At least a portion of the seats of the vehicle 102 can be controlled using seat actuators. The seat actuators can be controlled to adjust a tilt/angle of a back portion of a seat. When a seat has been reserved, the controller 108 can cause the back portion of a seat to angle forward to prevent a user from sitting in the seat. The back portion of the seat can be maintained in this angled position until the user who reserved the seat enters the vehicle.

The seat actuators can be controlled to rotate a position of the seat. For example, one or more of the seat actuators can be used to position the seat in a forward-facing orientation, a side facing-orientation, or a rear-facing orientation. In one use case, the controller 108 can cause a seat to rotate into a side facing-orientation until the user who reserved the seat enters the vehicle. When the user who reserved the seat enters the vehicle, the controller 108 can rotate the seat to a forward-facing orientation. Likewise, if another user who has not reserved a particular seat attempts to sit in a reserved seat, the controller 108 can be configured to rotate the seat away from the user to prevent the user from sitting in the seat.

Referring back to FIG. 1, the controller 108 can control the seat speaker 158 to output messages or warning tones. For example, the controller 108 can output a warning tone when the output of the seat occupancy sensor 148 or the location of the user determined from the interior camera 152 and/or the internal BLE module 160 indicate that the user attempting to sit in a seat that they have not reserved. In some instances, a message can be output through the seat speaker 158 to guide a user to their reserved seat. When the user has entered the vehicle 102, the controller 108 can cause the seat speaker 158 to output a tone or message that directs the user to their reserved seat.

The internal BLE module 160 can be used to triangulate a position/location of a user inside the vehicle 102. As noted above with respect to the external location module 134, the internal BLE module 160 can triangulate a position of the user based on signals exchanged with, or received from, the mobile device 122 of the user.

In an example use case, the controller 108 can utilize the external location module 134 to determine when a user is approaching the vehicle 102. As noted above, this can include signals exchanged between the external location module 134 and the mobile device 122 of the user. The user's identity can be confirmed through facial recognition performed on images obtained by the exterior camera 132. The controller 108 can transmit a plan view 166 of the seating arrangement of the vehicle 102 to the mobile device 122. The plan view 166 of the vehicle 102 can include an identification of the door of the vehicle associated with their reserved seat. This transmission can occur over a short-range wireless connection in some instances.

The controller 108 can cause the projector 136 to project a welcome mat or entry image in front of the door of the vehicle 102. An external display associated with other doors of the vehicle can point to the door of the vehicle 102 which the user should use to enter the vehicle. If available, the controller 108 can activate the electrochromic window 140, turning it from opaque to transparent. In some instances, rather than transitioning from opaque to transparent, the electrochromic window 140 could be activated to illuminate in a particular color. In some instances a UV projector could be used to write a message onto a window that includes an embedded phosphorescent material. These processes can occur when the user is within a specified distance from the vehicle 102, such as within 25 feet. Other distances can be used.

When the user is within five feet of the vehicle, the user can pause in front of one of the doors of the vehicle. When the user pauses in front of the door associated with the seat they have reserved, the user can utilize any of the door entry methods disclosed herein. When the user pauses in front of the door associated with the seat they have not reserved, the controller 108 can respond by warning the user or redirecting the user to the correct door. In some instances, the user can be addressed by name using an audible message. The controller 108 can cause a message to be transmitted to the mobile device 122 with instructions for entering the vehicle. If the user is attempting to enter the wrong door, the wrong door can be locked by the controller 108 to prevent entry. An external speaker associated with the door can emit a buzzer or other error tone to warn the user. In some instances, the error tone can vary in response to a distance of the user from the vehicle. The error tone can escalate in volume as the user closes in on the vehicle. The projected welcome mat or entry image in front of the door can be configured to flash to draw the user's attention.

After the user has entered the vehicle through a permitted door, the controller 108 can be configured to illuminate a path lighting 164 in the interior of the vehicle 102. The path lighting 164 can direct the user to their reserved seat. In some instances, the controller 108 can select a color of the path lighting 164 as green. Other foot-well lights associated with other seats can be dimmed or shut off temporarily until the user is seated.

As noted above, the controller 108 can cause non-occupied seats to be in a folded or stowed configuration until the user that reserved the seat arrives. This type of seat control method can minimize mechanism wear power use while discouraging other users from sitting in the seat. An alternate configuration for short seatbacks is to completely fold the seat forward. Alternate configurations for power swivel seats may include turning away from the aisle so that seats can be sat in. Seat control can be disabled for users who did not reserve the seat. The controller 108 can determine seat occupancy from the output of the internal BLE module 160, images from the interior camera 152, or the seat occupancy sensor 148.

The controller 108 can be configured to cause the seat speaker 158 to emit an audible message that informs the user that the path lighting 164 has been illuminated and that the light 150 associated with their reserved seat has been illuminated.

The controller 108 can be determined when the user is walking and a direction of travel from the output of the capacitive floor sensors 154. Thus, the controller 108 can determine if the user is moving towards or away from their reserved seat. If the user is not moving towards their reserved seat, the controller 108 can redirect the user using any of the measures disclosed herein. When the user sits in the wrong seat, the controller 108 can cause the seat speaker of the seat to emit a message that the user needs to move seats.

If the user does not sit in their assigned seat within a specified time frame (such as 15-20 seconds) the controller 108 can cause a speaker within the vehicle to announce a warning that if the user delays the vehicle they may be responsible for added charges. If the user continues to sit in the wrong seat then the following happens in sequence until the user moves. For example, the controller can cause a speaker to output a message that informs the user that they can be reassigned to the seat they are occupying for a fee. If user responds affirmatively then user can be charged. If the seat is taken then the customer can be told this and requested to move or otherwise agree to a very significant fee to pay for another vehicle being routed to pick up the user of the seat they occupied. If no response is received from the user, the controller can cause a speaker to output a message that no services may be provided to that seat (e.g., Wi-Fi, cabin or floor lighting, heat, cooling, inductive phone charging, and/or power outlets—just to name a few) but they may still be charged an added fee. In some instances, the controller 108 can cause a speaker associated with the seat the user occupies to play objectionable sounds (may only be heard by the person in the seat).

Figure 3:
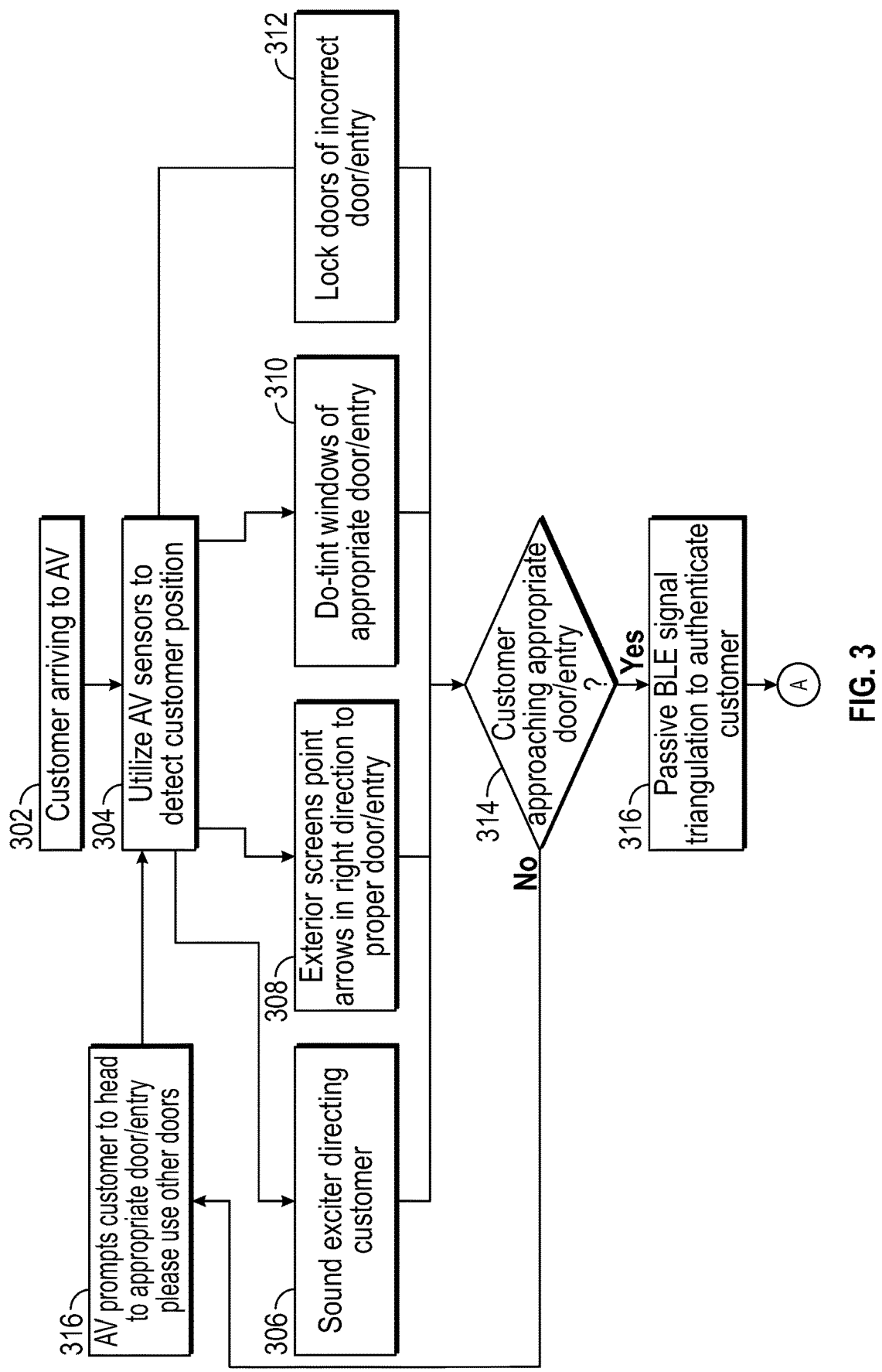
FIG. 3 is a flowchart of an example method of the present disclosure.
Figure 3:
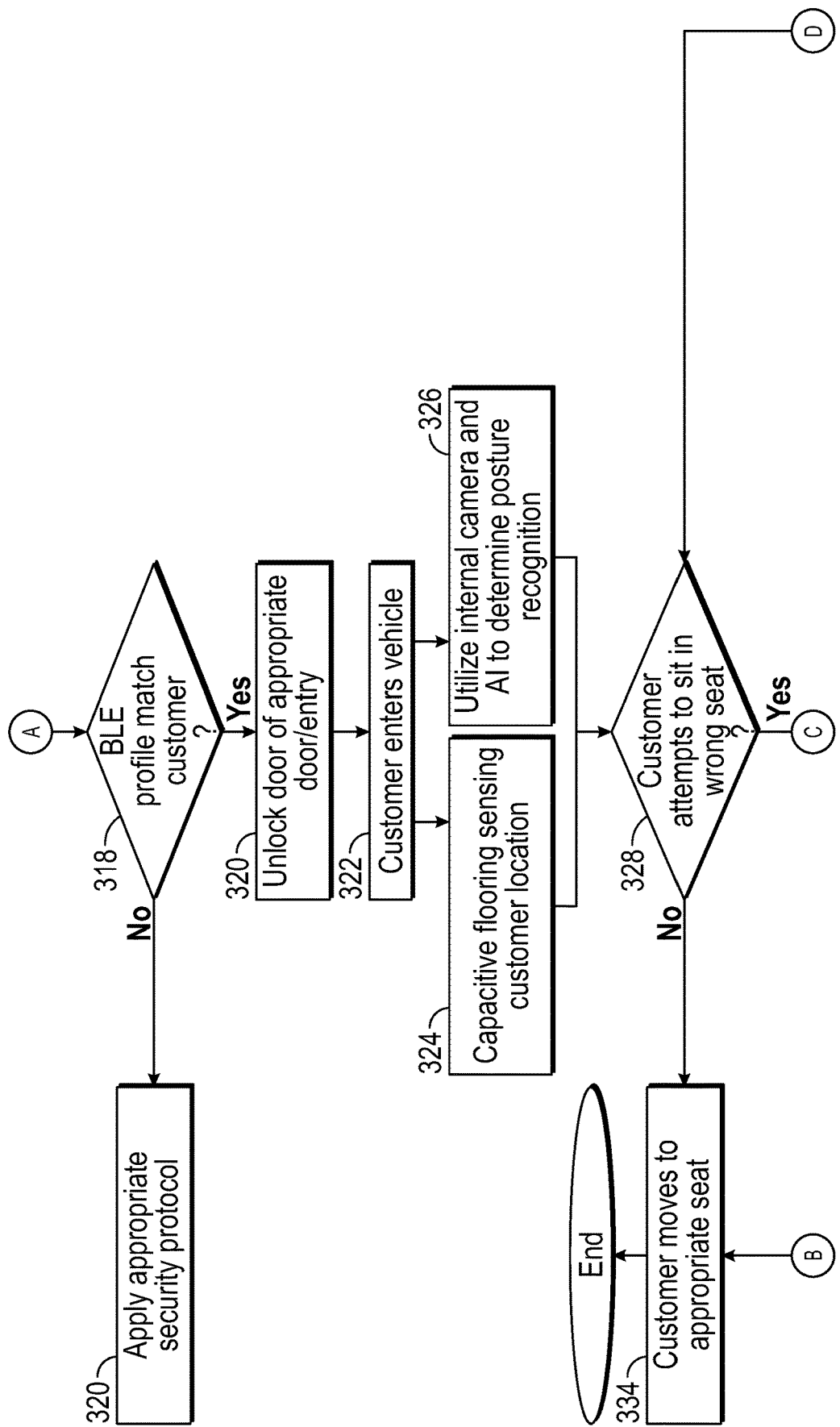
Figure 3:
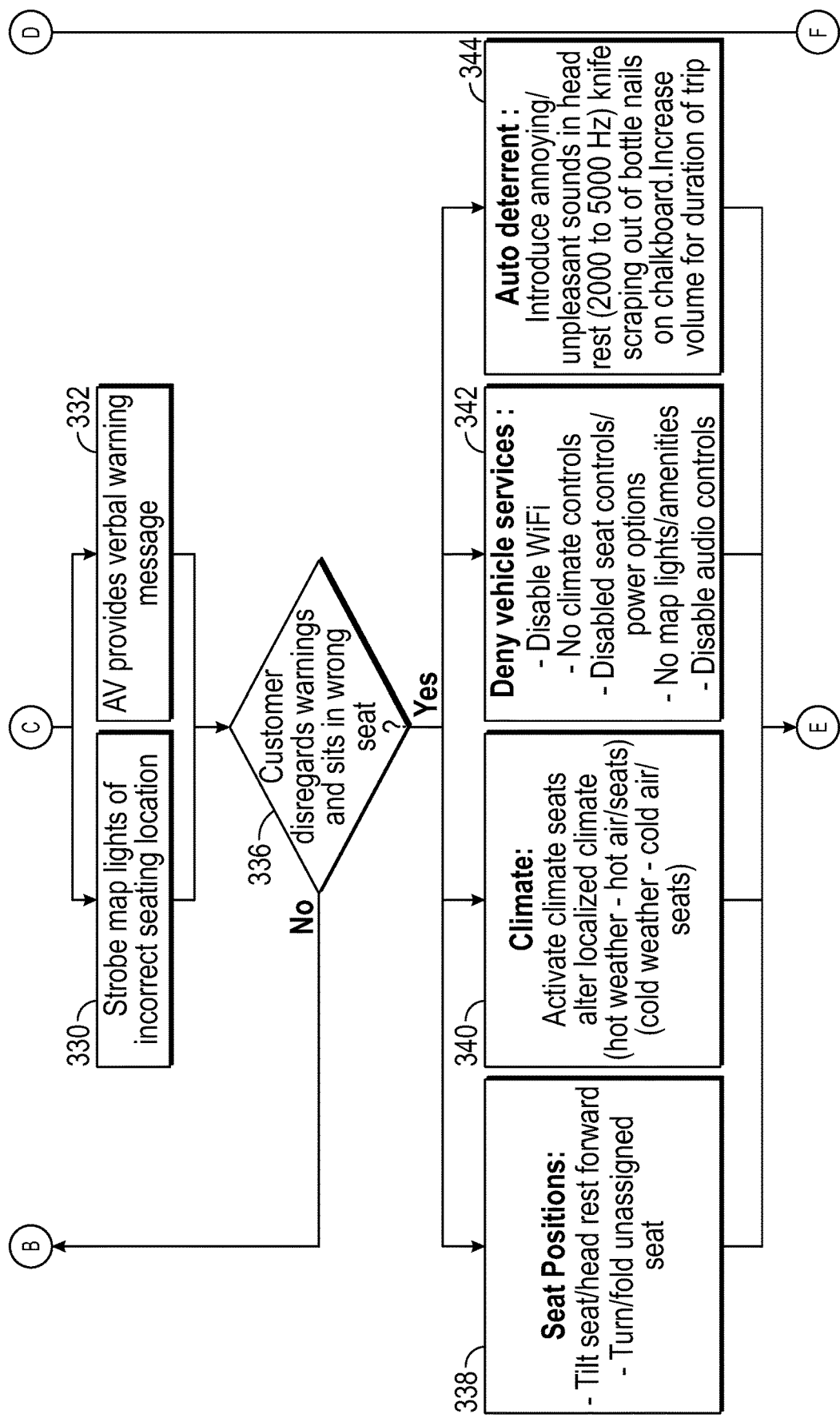

FIG. 3 is a flowchart of an example method of the present disclosure. The method can include a step 302 of a customer (e.g., user) arriving an autonomous ridehail vehicle (AV). Sensors associated with the AV, such as BLE and cameras can detect a customer position relative to the AV in step 304. To direct the user to a designated door, a sound exciter can be activated in step 306. An exterior display screen can present a directional arrow to guide the user to the designated door in step 308. An electrochromic window can be de-tinted or made transparent to identify the door the user should enter through in step 310. The designated door can be unlocked, while other doors remain locked or are actively locked in step 312. To be sure, any one or more of steps 306-312 can be used.

A determination can be made as to whether the user is approaching their designated door or another non-designated door in step 314. Again, this can be accomplished using data from a BLE module (communicating with a mobile device of the user), a camera, a capacitive touch door handle, and so forth. When the user is not approaching the designated door, any of the steps of 306-312 can be executed again to attempt to redirect the user.

In step 316, a passive BLE signal triangulation process between a BLE module of the vehicle and the user's mobile device can be used to authenticate and/or authorize the user. In step 318, a profile match process for the user can be conducted over BLE communication. The profile matching can be based on data stored in the mobile device or based on facial recognition of the user when a picture of the user is stored in their profile. To be sure, while BLE has been disclosed, other similar short-range wireless protocols can be used.

In step 318, the designated door can be unlocked when the user is authenticated. Security protocols can be implemented in step 320 if the user is not authenticated. This can include locking all vehicle doors as an example.

Once the customer enters the vehicle in step 322, the user's movements and location can be tracked using capacitive floor sensing in step 324. In step 326, the user's movements and location can be tracked using facial and posture recognition that is applied to images of the user obtained by a camera inside the vehicle cabin.

In step 328, a determination can be made as to whether the user is attempting to sit in a seat that they did not reserve. This can be based on image processing, seat sensor output, capacitive floor mat data, and combinations thereof. When the user attempts to sit in a seat that they did not reserve, the method can include a step 330 of strobing map or floor lights and provide a verbal warning in step 332. The user can move to their reserved or assigned seat in step 334. Step 336 includes determining if the user has disregarded warnings or redirection attempts. If the user has disregarded warnings and sits in a seat that they did not reserve, the method can include adjusting seat positions in step 338, altering seat-related climate settings in step 340 (such as heat or cold to provide a disincentive to the user), denying vehicle services in step 342, or provide an audio deterrent in step 344. Again, various permutations of steps 338-344 can be used in combination. When the user is determined to be sitting in a seat that they did not reserve in step 346 and the user refuses to move despite using one or more of the enforcement steps 338-344, the user can be presented with fee change options in step 348.

Figure 4:
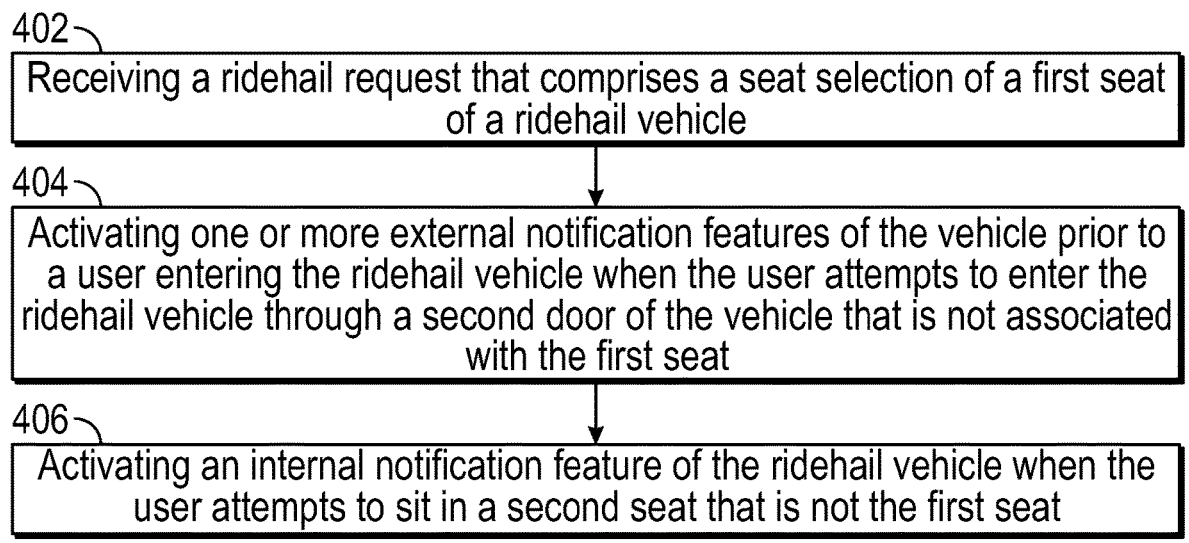
FIG. 4 is a flowchart of another method of the present disclosure.

FIG. 4 is a flowchart of an example method of the present disclosure. The method can include a step 402 of receiving a ridehail request that comprises a seat selection of a first seat of a ridehail vehicle. The first seat can be accessed through a first door of the ridehail vehicle. The first seat can be a reserved seat or an assigned seat for the user. The first door can be generally referred to as a designated door for the user. This may be a door that is located in a safe location such as a door aligned with a curb rather than a street-facing door. The door could be selected so that the user does not have to crawl over other seats or disturb other users to get to their reserved or assigned seat.

The method can include a step 404 of activating one or more external notification features of the vehicle prior to a user entering the ridehail vehicle when the user attempts to enter the ridehail vehicle through a second door of the vehicle that is not associated with the first seat. That is, a location of the user relative to the vehicle can be determined. When the user is positioned in front of the wrong door or on the wrong side of the vehicle (opposite of the designated door), the user can be warned using one or more external notification features.

An example, an external notification feature can include projecting a sound when the user attempts to open the second door of the ridehail vehicle not associated with the first seat. The external notification feature can include displaying a warning message on a display panel of the second door of the ridehail vehicle not associated with the first seat. The external notification feature can involve performing facial recognition to authenticate the user. The external notification feature can include triangulating a location of the user relative to the ridehail vehicle based on signals received from a mobile device of the user. The external notification feature can include projecting a warning message on an area in front of the first door to indicate to the user that the first seat can be access through the first door. The external notification feature can include unlocking the first door or registering when the user touches a handle of the second door than the first door. A can be projected when the user touches the handle.

When the user has entered the vehicle, the method can include a step 406 of activating an internal notification feature of the ridehail vehicle when the user attempts to sit in a second seat that is not the first seat. Example internal notification feature comprises any one or combination or permutation of illuminating a light associated with the first seat, performing facial recognition to authenticate the user using cameras inside the ridehail vehicle cabin, determining when the user is sitting or moving relative to the first seat using a capacitive floor sensor, triangulating a location of the user relative to the ridehail vehicle based on signals received from a mobile device of the user, activating a vibrating element of the second seat of the ridehail vehicle, outputting an audible message by a speaker associated with the ridehail vehicle, and/or angling a back portion of the second seat over a pan of the seat.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characterization have been described, embodiments of the disclosure may relate to numerous other device characterization. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   receiving a ridehail request comprising a seat selection of a first seat in a vehicle, the first seat being a reserved seat selected and reserved by a user submitting the ridehail request, wherein the first seat is accessible through a first door of the vehicle;
   activating, prior to the user entering the vehicle and based on the user attempting to enter the vehicle through a second door of the vehicle that is not associated with the first seat, an external notification feature of the vehicle; and
   activating, based on the user attempting to sit in a second seat that is not the first seat, an internal notification feature of the vehicle.

2. The method according to claim 1, wherein the external notification feature comprises projecting a sound indicating that the second door of the vehicle is not associated with the first seat.

3. The method according to claim 1, wherein the external notification feature comprises displaying a warning message on a display panel of the second door of the vehicle indicating that the second door of the vehicle is not associated with the first seat.

4. The method according to claim 1, wherein the external notification feature comprises performing facial recognition to authenticate the user.

5. The method according to claim 1, wherein the external notification feature comprises triangulating a location of the user relative to the vehicle based on signals received from a mobile device of the user.

6. The method according to claim 1, wherein the external notification feature comprises projecting a message on an area in front of the first door to indicate that the first seat is accessible through the first door.

7. The method according to claim 1, wherein the external notification feature comprises unlocking the first door.

8. The method according to claim 1, wherein the internal notification feature comprises any of:
   illuminating a light associated with the first seat;
   performing facial recognition to authenticate the user using cameras inside a cabin of the vehicle;
   determining that the user is sitting or moving relative to the first seat using a capacitive floor sensor;
   triangulating a location of the user relative to the vehicle based on signals received from a mobile device of the user;
   activating a vibrating element of the second seat of the vehicle;
   outputting an audible message by a speaker associated with the vehicle; and/or angling a back portion of the second seat.

9. A system, comprising:
   an external notification mechanism;
   an internal notification mechanism; and
   a controller comprising a processor and a memory for storing instructions, the processor executing the instructions to:
      receive a ridehail request that comprises a seat selection of a first seat of a vehicle, the first seat being a reserved seat selected and reserved by a user submitting the ridehail request, the first seat being accessible through a first door of the vehicle;
      activate the external notification mechanism of the vehicle prior to the user entering the vehicle when the user attempts to enter the vehicle through a second door of the vehicle that is not associated with the first seat; and
      activate the internal notification mechanism of the vehicle when the user attempts to sit in a second seat that is not the first seat.

10. The system according to claim 9, wherein the external notification mechanism comprises an external speaker, the processor executing the instructions to cause the external speaker to project a sound when the user attempts to open the second door of the vehicle.

11. The system according to claim 9, wherein the external notification mechanism comprises an external display associated with the second door of the vehicle, the processor executing the instructions to cause the external display to display a warning message.

12. The system according to claim 9, wherein the external notification mechanism comprises a camera, the processor executing the instructions to cause the camera to obtain images of the user and perform facial recognition to authenticate the user.

13. The system according to claim 9, wherein the external notification mechanism comprises a location module, the processor executing the instructions to cause the location module to triangulate a location of the user relative to the vehicle based on signals received from a mobile device of the user.

14. The system according to claim 9, wherein the external notification mechanism comprises a projector, the processor executing the instructions to cause the projector to project a warning message on an area in front of the first door to indicate to the user that the first seat is accessible through the first door.

15. The system according to claim 9, wherein the external notification mechanism comprises a touch-response handle, the processor executing the instructions to cause the first door to unlock or register when the user touches a handle of the second door, wherein a sound is projected by an external speaker when the user touches the handle of the second door.

16. The system according to claim 9, wherein the internal notification mechanism comprises any of:
   a light associated with the first seat that is configured to be illuminated to provide an indication to the user;
   a camera inside the vehicle that is configured to use facial recognition to authenticate the user;
   a capacitive floor sensor that outputs signals that indicate when the user is sitting or moving relative to the first seat;
   a location module that triangulates a location of the user relative to the vehicle based on signals received from a mobile device of the user;

a vibrating element associated with the second seat of the vehicle, the vibrating element being activated when the user attempts to sit in the second seat;

a speaker associated with another seat of the vehicle, the speaker outputting an audible message to warn the user; and a seat actuator that inclines a back portion of the second seat to prevent the user from sitting in the second seat.

17. A device, comprising:

a processor; and a memory for storing instructions, the processor executing the instructions to:

receive a ridehail request that comprises a seat selection of a first seat of a vehicle, the first seat being a reserved seat selected and reserved by a user submitting the ridehail request, the first seat being accessible through a first door of the vehicle;

activate an external notification mechanism of the vehicle prior to the user entering the vehicle when the user attempts to enter the vehicle through a second door of the vehicle that is not associated with the first seat; and activate an internal notification mechanism of the vehicle when the user attempts to sit in a second seat that is not the first seat.

18. The device according to claim 17, wherein the external notification mechanism comprises any of:

an external speaker, the processor executing the instructions to cause the external speaker to project a sound when the user attempts to open the second door of the vehicle;

an external display associated with the second door of the vehicle, the processor executing the instructions to cause the external display to display a warning message;

a camera, the processor executing the instructions to cause the camera to obtain images of the user and perform facial recognition to authenticate the user;

a location module, the processor executing the instructions to cause the location module to triangulate a location of the user relative to the vehicle based on signals received from a mobile device of the user;

a projector, the processor executing the instructions to cause the projector to project a warning message on an area in front of the first door to indicate to the user that the first seat is accessible through the first door; or a touch-response handle, the processor executing the instructions to cause the first door to unlock or register when the user touches a handle of the second door, wherein a sound is projected by an external speaker when the user touches the handle of the second door.

19. The device according to claim 18, wherein the internal notification mechanism comprises any one or more of:

a light associated with the first seat that is configured to be illuminated to provide an indication to the user;

a camera inside the vehicle that is configured to use facial recognition to authenticate the user;

a capacitive floor sensor that outputs signals that indicate when the user is sitting or moving relative to the first seat; and a location module that triangulates a location of the user relative to the vehicle based on signals received from a mobile device of the user.

20. The device according to claim 19, wherein the internal notification mechanism comprises any one or more of:

a vibrating element associated with the second seat of the vehicle, the vibrating element being activated when the user attempts to sit in the second seat;

a speaker associated with another seat of the vehicle, the speaker outputting an audible message to warn the user; and a seat actuator that inclines a back portion of the second seat to prevent the user from sitting in the second seat.

* * * * *